(12) United States Patent
Kelkar (10) Patent No.: US 12,391,270 B2
(45) Date of Patent: Aug. 19, 2025

(54) SYSTEMS AND METHODS FOR ADVANCED VEHICULAR ALERTS

(71) Applicant: Honda Motor Co., Ltd., Tokyo (JP)

(72) Inventor: Paritosh Kelkar, Sunnyvale, CA (US)

(73) Assignee: Honda Motor Co., Ltd., Tokyo (JP)

(*) Notice: Subject to any disclaimer, the term of this patent is extended or adjusted under 35 U.S.C. 154(b) by 230 days.

(21) Appl. No.: 18/191,521

(22) Filed: Mar. 28, 2023

(65) Prior Publication Data

US 2024/0326851 A1 Oct. 3, 2024

(51) Int. Cl.
*B60W 50/14* (2020.01)
*B60W 40/02* (2006.01)

(52) U.S. Cl.
CPC ............ *B60W 50/14* (2013.01); *B60W 40/02* (2013.01); *B60W 2050/143* (2013.01); *B60W 2050/146* (2013.01); *B60W 2555/20* (2020.02); *B60W 2556/45* (2020.02)

(58) Field of Classification Search
CPC .................................................... B60W 50/14
See application file for complete search history.

(56) References Cited

U.S. PATENT DOCUMENTS

| | | | | |
|---|---|---|---|---|
| 11,688,266 B2* | 6/2023 | Yamasaki | ............. | H04W 4/023 340/425.5 |
| 2007/0067086 A1* | 3/2007 | Rothschild | ............... | G07C 5/02 701/93 |
| 2015/0057831 A1* | 2/2015 | Finlow-Bates | .. | G08G 1/096758 701/1 |
| 2019/0102840 A1* | 4/2019 | Perl | .......................... | G06N 3/08 |
| 2020/0156538 A1* | 5/2020 | Harper | ................... | G10K 11/34 |
| 2022/0185312 A1* | 6/2022 | Hegde | .................... | G08G 1/056 |
| 2022/0351613 A1* | 11/2022 | Hu | ...................... | G08G 1/09626 |
| 2024/0400076 A1* | 12/2024 | Tokman | ................. | G08G 1/167 |
| 2024/0416925 A1* | 12/2024 | Brannan | .............. | B60W 30/08 |

* cited by examiner

*Primary Examiner* — Travis R Hunnings
(74) *Attorney, Agent, or Firm* — Armstrong Teasdale LLP (57) ABSTRACT

A vehicle is provided. The vehicle includes a vehicle controller. The vehicle controller is programmed to (i) retrieve current date, time, and vehicle location; (ii) retrieve a plurality of context information based upon the current vehicle location; (iii) analyze the plurality of context information based upon the current date and time; (iv) generate at least one alert message based upon the analysis of the plurality of context information in view of the current date, time, and vehicle location; and (v) present the at least one alert message to a driver of the vehicle.

20 Claims, 5 Drawing Sheets

SYSTEMS AND METHODS FOR ADVANCED VEHICULAR ALERTS

FIELD OF THE INVENTION

The present disclosure relates to vehicular alerts and, more particularly, to a system and method for adjusting and determining vehicle alerts based upon real-time conditions.

BACKGROUND

Vehicular alerts are designed to assist a driver and improve safety. However, warnings/alerts can sometimes be more frustrating than helpful when they are not triggered at the right time or are not pertinent to the current or future situations. In addition, such alerts may obscure screens or be provided in manners that are not helpful. Accordingly, a context aware system for providing vehicle alerts would be desirable.

BRIEF SUMMARY

In one aspect, a vehicle is provided. The vehicle includes a vehicle controller. The vehicle controller is programmed to retrieve current date, time, and vehicle location. The vehicle controller is also programmed to retrieve a plurality of context information based upon the current vehicle location. The vehicle controller is further programmed to analyze the plurality of context information based upon the current date and time. In addition, the vehicle controller is programmed to generate at least one alert message based upon the analysis of the plurality of context information in view of the current date, time, and vehicle location. Furthermore, the vehicle controller is programmed to present the at least one alert message to a driver of the vehicle. The vehicle may have additional, less, or alternate functionality, including that discussed elsewhere herein.

In another aspect, a computer device is provided. The computer device includes at least one memory and at least one processor in communication with the at least one memory. The at least one processor is programmed to retrieve current date, time, and vehicle location. The at least one processor is also programmed to retrieve a plurality of context information based upon the current vehicle location. The at least one processor is further programmed to analyze the plurality of context information based upon the current date and time. In addition, the at least one processor is programmed to generate at least one alert message based upon the analysis of the plurality of context information in view of the current date, time, and vehicle location. Furthermore, the at least one processor is programmed to present the at least one alert message to a driver of the vehicle. The computer device may have additional, less, or alternate functionality, including that discussed elsewhere herein.

In still another aspect, a method for controlling a vehicle is provided. The method is implemented on a vehicle controller associated with the vehicle including at least one processor in communication with at least one memory. The method includes retrieving current date, time, and vehicle location. The method also includes retrieving a plurality of context information based upon the current vehicle location. The method further includes analyzing the plurality of context information based upon the current date and time. In addition, the method includes generating at least one alert message based upon the analysis of the plurality of context information in view of the current date, time, and vehicle location. Furthermore, the method includes presenting the at least one alert message to a driver of the vehicle. The method may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments may relate to, inter alia, systems and methods for vehicular alerts and, more particularly, to a system and method for adjusting and determining vehicle alerts based upon real-time conditions. In an exemplary embodiment, the process is performed by a vehicle controller computer device, also known as a vehicle controller. In other embodiments, the vehicle controller computer device is a collection of controllers that communicate with each other to operate the following vehicle. In some embodiments, the alerts and/or warnings are presented to the driver on a screen and/or audible presented via one or more speakers.

In the exemplary embodiment, the vehicle includes a plurality of sensors that allow the vehicle to observe its surroundings in real-time. The sensors can include, but are not limited to, radar, LIDAR, proximity sensors, ultrasonic sensors, electromagnetic sensors, wide RADAR, long distance RADAR, Global Positioning System (GPS), video devices, imaging devices, cameras, audio recorders, temperature sensors, and computer vision. The vehicle controller receives information from the sensors. In the exemplary embodiment, the vehicle controller is also in communication with one or more remote servers that can provide context information. For example, the one or more remote servers may provide network time protocol (NTP) data to the vehicle. Furthermore, the one or more remote servers may include a weather forecasting server that allows the vehicle controller to know the current and potentially near-future weather for its location. In some embodiments, the vehicle controller receives the weather information in real-time from a live Internet connection. In other embodiments, the vehicle controller downloads the weather information for at least the current day at a point in the day, such as when the vehicle is connected to a home Wi-Fi network.

The vehicle controller uses the sensor information and the context information from the one or more remote servers to adjust one or more alert or messaging settings for the vehicle. This includes, but is not limited to, prioritizing different alerts and/or messages based upon the current situation, generating alerts and/or messages to present to the driver based upon the current situation, and/or hiding different alerts and/or messages based on the current situation. In some further embodiments, the vehicle controller adjusts the volume of the audible portion of the alerts. For example, when the vehicle is in the middle of a noisy city, the alerts may be louder. While the vehicle is travelling on a quiet night, the alerts may be presented at a lower volume.

In at least one embodiment, the vehicle controller combines the current location of the vehicle, the time of day, date, day of week, and/or weather to determine which alerts and/or messages to present to the driver. The vehicle controller may determine the current location of the vehicle from GPS information, cameras, and/or wireless connections. For example, the vehicle may be connected to a Wi-Fi network at the driver's home. The vehicle controller can use that connection to determine the vehicle is at the driver's home, even if the vehicle controller is unable to determine current GPS coordinates for the vehicle. The vehicle controller can also use the camera to determine that the vehicle is in a parking lot, a parking garage, and/or parked on the side of the road, for example.

In one example embodiment, the vehicle controller determines from the remote servers and/or the sensors that there are icy conditions and presents an alert to the driver to be careful because conditions are icy. In some embodiments, the vehicle controller receives weather information from the one or more remote servers. In other embodiments, the vehicle controller determines the icy conditions based on the current measured temperature and/or images of ice and/or snow captured by the cameras of the vehicle. In another example, the vehicle controller determines that the vehicle is in a parking lot of an elementary school. The vehicle controller then determines the current time and date. If the time is close to when school starts and/or ends, the vehicle controller generates an alert to the driver to watch out for children.

In some other embodiments, the vehicle controller may determine that the vehicle is close to a construction zone, a school zone, an accident, a traffic slow down, in a parking lot, and/or other locations where the driver should pay careful attention. For example, the vehicle controller may determine that the vehicle is approaching a school zone. The vehicle controller further determines that it is during active school hours and present a message telling the driver that they are approaching a school zone. If the time is 10 PM, then the vehicle controller determines not to present the school zone message. Or if the time is during school hours, but it is a school holiday, then the vehicle controller determines not to present the school zone message.

In another time-based example, the vehicle controller determines that the time is close to 2 AM, when taverns are required to close in that area. The vehicle controller then alerts the driver to be alert for impaired drivers.

In some of these embodiments, the vehicle controller is in communication with a mapping program and receives context information from the mapping program. In these embodiments, the vehicle controller may warn the driver about uncontrolled railroad crossings, massive potholes, steel plates, and/or other road hazards. The vehicle controller may retrieve the railroad schedule from the one or more remote servers and warn the driver that they may be approaching an active railroad crossing. In some of these embodiments, the mapping program and/or the remote servers provide construction truck entrances, and then the vehicle controller warns the driver to watch for vehicles entering and/or leaving those entrances.

In still further embodiments, the vehicle controller may learn about concert venues and/or sports stadiums and generate alerts to the driver when there may be a concert, event, and/or sporting event starting and/or letting out and causing traffic issues.

In some further embodiments, the processing is performed by a mobile device connected to the vehicle controller. In other embodiments, the processing is performed by one or more remote servers, such as cloud servers, and then the messages and/or alert settings are transmitted to the vehicle controller.

At least one of the technical problems addressed by this system may include: (i) improving the safety of vehicular travel in a following situation; (ii) reducing the distraction of the driver from too many alerts and/or messages; (iii) improved accuracy of provided alerts and/or messages; and (iv) alerting the driver and/or vehicle to important conditions based on the context in real-time.

The methods and systems described herein may be implemented using computer programming or engineering techniques including computer software, firmware, hardware, or any combination or subset thereof, wherein the technical effects may be achieved by performing at least one of the following steps: a) retrieve current date, time, and vehicle location; b) retrieve a plurality of context information based upon the current vehicle location; c) analyze the plurality of context information based upon the current date and time; d) generate at least one alert message based upon the analysis of the plurality of context information in view of the current date, time, and vehicle location; e) present the at least one alert message to a driver of the vehicle; f) the plurality of context information includes weather information; g) the at least one alert message is a warning about current driving conditions based on the weather information; h) the context information includes current traffic information; i) the at least one alert message is a warning about current driving conditions; j) the at least one alert message is a warning that the vehicle is entering one of a school zone and a construction zone; k) the vehicle controller is further programmed to determine whether or not to present the at least one alert message based on the current time and the hours associated with the school zone; l) determine that the current date is a school holiday from the plurality of context information and prevent display of the at least one message associated with the school zone; m) determine whether or not to present the at least one alert message based on the dates and times associated with the construction zone in view of the current date and time; n) prioritize one or more messages based upon the analysis of the context information in view of the current date, time, and vehicle location; o) determine the current location of the vehicle based upon the plurality of sensors; p) determine a current noise level and adjust a volume for presenting the at least one alert message based upon the current noise level; and q) retrieve the current speed of the vehicle, and determine whether or not to present the at least one message based upon the current speed of the vehicle.

Various embodiments will be better understood when read in conjunction with the appended drawings. To the extent that the figures illustrate the functional blocks of various embodiments, the functional blocks are not necessarily indicative of a division between hardware circuitry. Thus, for example, one or more of the functional blocks (e.g., systems, devices, processors, controllers, and/or memories) may be implemented in a single piece of hardware (e.g., a general purpose signal processor or random access memory, hard disk, or the like) or in multiple pieces of hardware. Similarly, any program may be a stand-alone program, may be incorporated as subroutines in an operating system, may be a function(s) in an installed software package, and/or the like. It should be understood that the various embodiments are not limited to the arrangements and instrumentality shown in the drawings.

Various embodiments of methods and systems for controlling functions of an exemplary vehicle control system, including a vehicle infotainment system, are provided. It should be noted that although the various embodiments are described in connection with the automotive industry, such as for use with an automobile, one or more embodiments may be implemented in different industries and for different applications. Additionally, communication of information used in accordance with one or more embodiments may be performed with different types of communication protocols, as well as using different types of communication lines and communication buses.

Figure 1:
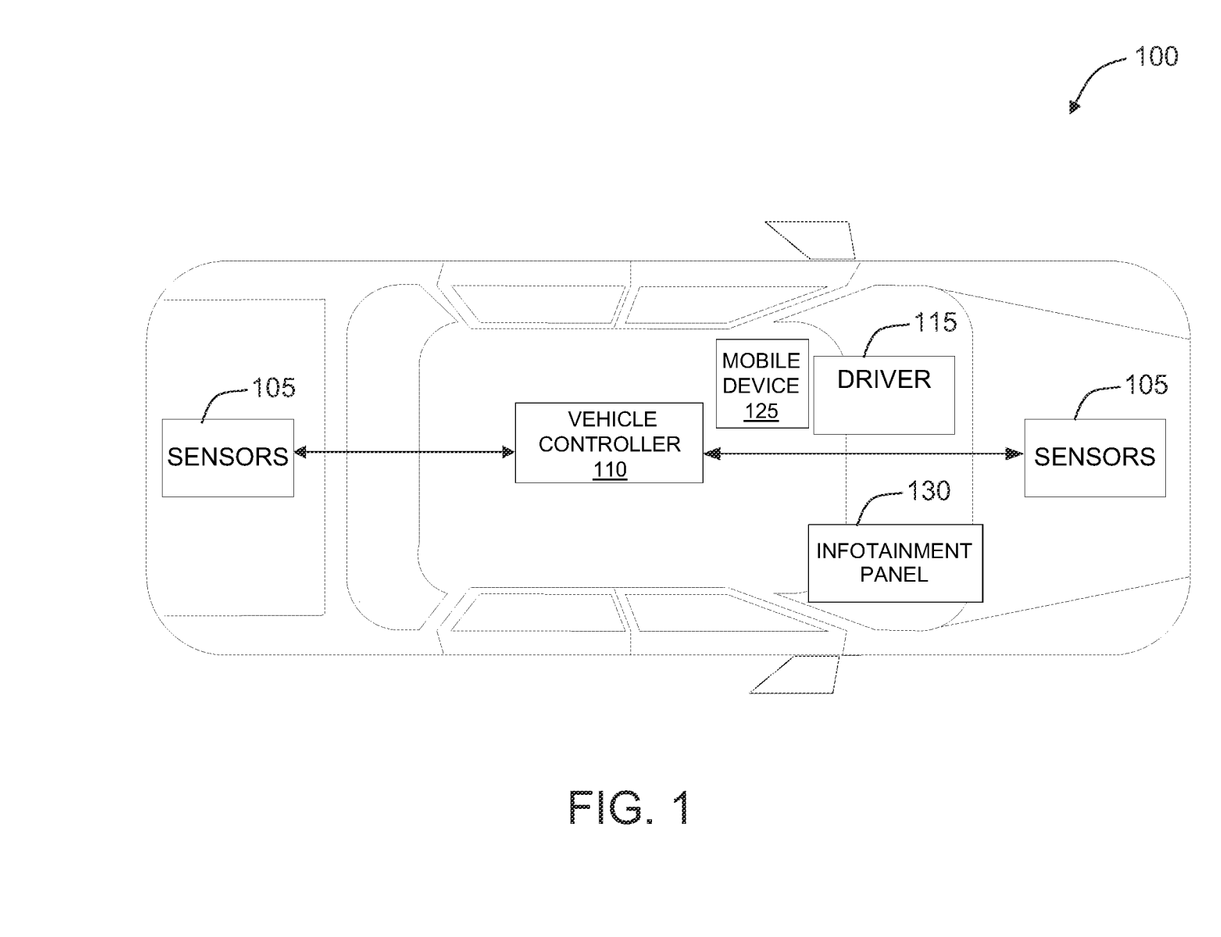
FIG. 1 illustrates a schematic diagram of an exemplary vehicle, in accordance with one embodiment of the present disclosure.

FIG. 1 depicts a top view of an exemplary vehicle 100, in accordance with one embodiment of the present disclosure. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and navigating without human input. In other embodiments, vehicle 100 is a manual vehicle or a semi-autonomous vehicle with driver assistance systems, such as, but not limited to, lane keep assistance, adaptive cruise control, and parallel parking assistance, where the vehicle may be a traditional automobile that is controlled by a driver 115.

Vehicle 100 may include a plurality of sensors 105 and a vehicle controller 110. The plurality of sensors 105 may detect the current surroundings and location of vehicle 100. Plurality of sensors 105 may include, but are not limited to, odometer, speedometer, accelerometers, wheel sensors, radar, LIDAR, proximity sensors, ultrasonic sensors, electromagnetic sensors, wide RADAR, long distance RADAR, Global Positioning System (GPS), video devices, imaging devices, cameras, audio recorders, and computer vision. Plurality of sensors 105 may also include sensors that detect conditions of vehicle 100, such as covered distance, speed, acceleration, gear, braking, and other conditions related to the operation of vehicle 100, for example: at least one of a measurement of at least one of time, speed, direction, rate of acceleration, rate of deceleration, location, position, orientation, and rotation of the vehicle, and a measurement of one or more changes to at least one of time, speed, direction, rate of acceleration, rate of deceleration, location, position, orientation, and rotation of the vehicle. Furthermore, plurality of sensors 105 may include impact sensors that detect impacts to vehicle 100, including force and direction and sensors that detect actions of vehicle 100, such the deployment of airbags. In some embodiments, plurality of sensors 105 may detect the presence of driver 115 and one or more passengers (not shown) in vehicle 100. In these embodiments, plurality of sensors 105 may detect the presence of fastened seatbelts, the weight in each seat in vehicle 100, heat signatures, or any other method of detecting information about driver 115 and/or passengers in vehicle 100.

In some embodiments, the plurality of sensors 105 may include sensors for determining weight distribution information of vehicle 100. Weight distribution information may include, but is not limited to, the weight and location of remaining gas, luggage, occupants, and/or other components of vehicle 100. In some embodiments, plurality of sensors 105 may include sensors for determining remaining gas, luggage weight, occupant body weight, and/or other weight distribution information. Furthermore, the plurality of sensors 105 may detect attachments to the vehicle 100, such as cargo carriers or bicycle racks attached to the top of the vehicle 100 and/or a trailer attached to a hitch on the rear of the vehicle 100.

In some embodiments, the plurality of sensors 105 include cameras, LIDAR, radar, proximity detectors, and/or other sensors 105 that provide information about the surroundings of the vehicle 100, such as, but not limited to, other vehicles including vehicle type and vehicle load, obstacles, traffic flow information including road signs, traffic lights, and other traffic information, and/or other environmental information.

Vehicle controller 110 may interpret data received from sensors 105 (e.g., the sensory information) to identify appropriate navigation paths, detect threats, and react to conditions. In some embodiments, vehicle controller 110 may be able to communicate with one or more remote computer devices, such as mobile device 125. Mobile device 125 may include, but is not limited to, a cellular phone, a smart phone, and/or any other portable computing device brought into and removed from vehicle 100. In the example embodiment, mobile device 125 is associated with driver 115 and includes one or more internal sensors, such as an accelerometer, a gyroscope, and/or a compass. Mobile device 125 may be capable of communicating with vehicle controller 110 wirelessly. In addition, vehicle controller 110 and mobile device may be configured to communicate with computer devices located remotely from vehicle 100.

In some embodiments, the vehicle controller 110 is a plurality of controllers associated with different sensors and/or controls of the vehicle 100. The plurality of controllers are in communication with each other, such as through a Controller Area Network (e.g., CAN bus) (not shown).

The vehicle controller 110 may receive user preferences from the user through the mobile device 125 or an infotainment panel 130. The vehicle controller 110 may also receive preferences via one or more remote servers 226 (shown in FIG. 2). These remote servers 226 may be associated with the vehicle manufacturer or other service provider that provides preferences and/or other information. The remote servers 226 may also provide traffic information including, but not limited to, travel routes, maps, traffic light timing, and current traffic load in areas around the vehicle 100. The remote servers 226 may also provide time and date information, weather information, information about construction, school zones, and other information about the area where the vehicle 100 is currently located.

In some embodiments, vehicle 100 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 110.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; hazard avoidance; navigation or GPS-related systems; security and/or anti-hacking measures; and/or theft prevention systems.

While vehicle 100 may be an automobile in the exemplary embodiment, in other embodiments, vehicle 100 may be, but is not limited to, a bus, a low-speed vehicle, a motorcycle, a utility task vehicle, a truck, construction equipment, and/or any other type of vehicle that would benefit from the vehicle controller 110 described herein.

Figure 2:
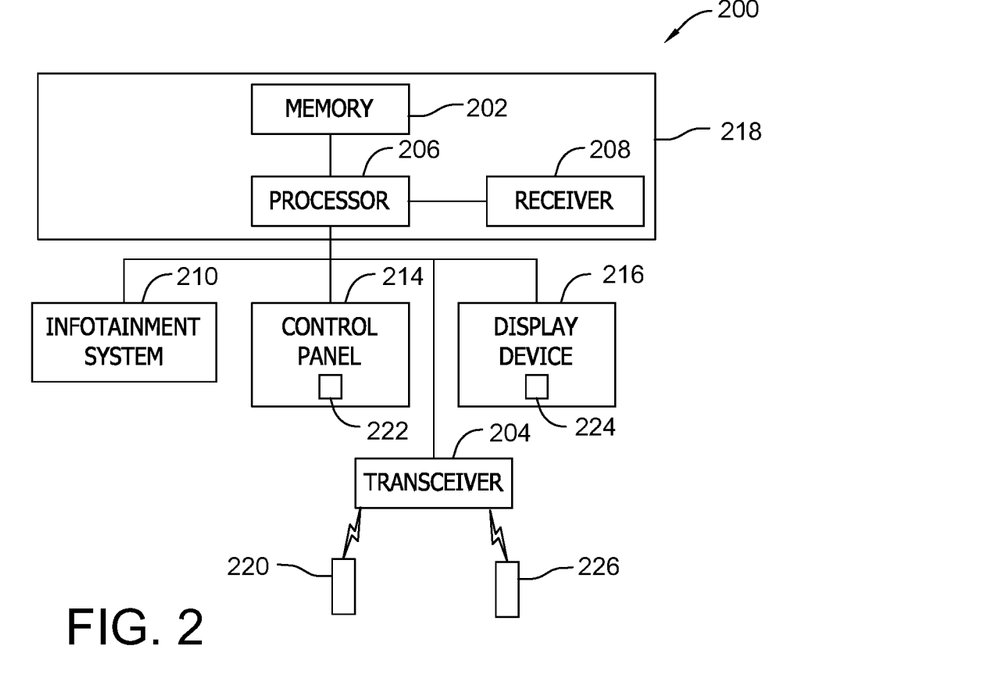
FIG. 2 is a block diagram of an exemplary vehicle control system for the vehicle shown in FIG. 1, in accordance with one embodiment of the present disclosure.

FIG. 2 is a block diagram of an exemplary vehicle control system 200 for the vehicle 100 (shown in FIG. 1), in accordance with one embodiment of the present disclosure. In the exemplary embodiment, the vehicle control system 200 includes a memory 202, a transceiver 204, a processor 206, a receiver 208, a vehicle infotainment system 210, a control panel 214, and a display device 216. In some embodiments, the memory 202, the transceiver 204, the processor 206, and/or the receiver 208 may be included in a computing device, such as a controller 218 for the system 200, which may control or otherwise be communicatively coupled to any other component within the system 200 (e.g., the vehicle infotainment system 210, the control panel 214, and/or the display device 216). In at least one embodiment, controller 218 is similar to and/or a part of vehicle controller 110 (shown in FIG. 1).

The processor 206 may include one or more conventional electronic processors that interpret and execute instructions. The memory 202 may include a random access memory (RAM), a read-only memory (ROM), and/or another type of dynamic or static storage device that stores information and instructions for execution by the processor 206. The RAM, or another type of dynamic storage device, may store instructions as well as temporary variables or other intermediate information used during execution of instructions by the processor 206. The ROM, or another type of static storage device, may store static information and instructions for the processor 206.

The transceiver 204 may communicate with the processor 106 via a communication line, and may communicate wirelessly or via a wired connection with a portable device 220. The portable device 220 may include a mobile phone or other communication device, such as mobile device 125 (shown in FIG. 1). In some embodiments, the transceiver 204 may communicate wirelessly with the portable device 220 via a Bluetooth® protocol (Bluetooth is a registered trademark of Bluetooth Sig., Inc. of Bellevue, Wash.). In other embodiments, another wireless protocol may be used. In some embodiments, the transceiver 204 may be included as part of the controller 218.

In the exemplary embodiment, vehicular infotainment system 210 may be used to enable the user to access entertainment options and climate controls for the vehicle 100. The vehicle infotainment system 210 may include one or more speakers for playing audio content, as well as one or more controls for controlling audio output from one or more of the speakers. The vehicle infotainment system 210, in some embodiments, includes a rear entertainment system, such that passengers in a rear passenger location of the vehicle 100 may be entertained. The rear entertainment system may include a display screen for displaying video or picture content in combination with audio content, and one or more speakers located at one or more rear passenger locations of the vehicle 100 to play the audio content. In some such embodiments, audio content delivered using the rear entertainment system may be different than audio content delivered to a front portion of the vehicle 100.

The control panel 214 may communicate with the processor 206 via a communication line to transmit data to/from the control panel 214, such as for control of other modules or systems of the vehicle control system 200. In the exemplary embodiment, the control panel 214 includes, and/or is communicatively coupled to, a touchpad 222 for receiving an input from a user for control of the vehicle control system 200. Additionally or alternatively, the control panel 214 may include other input mechanisms, such as mechanical buttons or other controls (e.g., knobs, switches, etc.) associated with the touchpad 222 to receive inputs for controlling the vehicle 100 control system 200. The control panel 214 may have a dedicated control module or unit configured to process the control inputs and/or to process the data to be displayed on the display device 216 and/or the touchpad 222. Alternatively, such control functions may be processed by the processor 206 (e.g., as part of the controller 218). In the exemplary embodiment, the touchpad 222 is configured to detect when a finger touches it, for example, based on a measured force, resistance, and/or capacitance. The touchpad 222 may sense the user's finger movement and downward pressure. In some embodiments, the control panel 214 interprets the user's movements and pressure to determine the user's inputs. In the exemplary embodiment, the touchpad 222 is remote from any display screen 224.

The display device 216 may communicate with the processor 206 via a communication line to transmit data to/from the display device 216, such as for display of various information to the user of the vehicle 100. In the exemplary embodiment, the display device 216 includes a display screen 224 for displaying information to the user. In one embodiment, the display device 216 is separate from the control panel 214, such as located at a different location in the vehicle 100. For example, the display screen 224 may be selectively positioned for convenient viewing by the user, and the touchpad 222 may be selectively positioned within a comfortable distance from a hand of the user. The display screen 224 may display different icons, graphics, and the like. In an alternative embodiment, the display device 216 and the control panel 214 are included within one device. For example, the touchpad 222 is combined with the display screen 224, such as via a touchscreen that functions as both an output device and an input device.

The transceiver 204 may wirelessly or via a wired connection with one or more remote servers 226. More specifically, transceiver 204 may be communicatively coupled to one or more remote servers 226 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. In at least one embodiment, the transceiver 204 may connect to remote servers 226 through a Wi-Fi connection, such as when at the driver's home. In a further embodiment, the transceiver 204 may connect to remote servers 226 through a cellular connection. In some further embodiments, the transceiver 204 may connect to the remote servers 226 through the mobile device 125 and/or portable device 220.

These remote servers 226 may be associated with the vehicle manufacturer or other service provider that provides preference and/or other information. The remote servers 226 may also provide traffic information including, but not limited to, travel routes, maps, traffic light timing, and current traffic load in areas around the vehicle 100. The remote servers 226 may also provide weather information, information about construction, school zones, and other information about the area where the vehicle 100 is currently located.

In the exemplary embodiment, the vehicle controller 110 uses the sensor information and the context information from the one or more remote servers 226 (shown in FIG. 2) to adjust one or more alert or messaging settings for the vehicle. This includes, but is not limited to, prioritizing different alerts and/or messages based upon the current situation, generating alerts and/or messages to present to the driver based upon the current situation, and/or hiding different alerts and/or messages based on the current situation.

In one example embodiment, the vehicle controller 110 determines from the remote servers 226 and/or the sensors 105 (shown in FIG. 1) that there are icy conditions and/or that weather conditions may lead to the formation of ice on the road. The vehicle controller 110 also determines the current time of day and/or the current brightness level where the vehicle 100 is located. The vehicle controller 110 may determine how bright it is outside based on the current time of day, a light sensor, and/or based on whether the vehicle headlights are on or off. When it is sufficiently bright outside, the driver is more likely to be able to see slippery road conditions. A specific ice warning may not be helpful during the day. However, it is harder to see slippery road conditions when it is dark. In some embodiments, when conditions are favorable for icy conditions, and the light level outside the vehicle is below a predefined threshold, the vehicle controller 110 presents an alert to the driver 115 to be careful because it is dark/getting dark and the road may be icy. In some embodiments, the vehicle controller 110 receives weather information from the one or more remote servers 226 (shown in FIG. 2). In other embodiments, the vehicle controller 110 determines the icy conditions based on the current measured temperature and/or images of ice and/or snow captured by the cameras of the vehicle 100.

In another example, the vehicle controller 110 determines that the vehicle 100 is approaching a school zone (e.g., the vehicle is on a road where the school is located or in a parking lot of the school). For example, the vehicle controller 110, based on location data received from the GPS and map data received from remote servers 226 or stored in memory 202, determines that vehicle 100 is in or approaching a school zone. The vehicle controller 110 may also determine that vehicle 100 is in or approaching a school zone based on signs identified within images captured by the cameras of the vehicle 100. The vehicle controller 110 then determines the current date and time. If it is a school day (e.g., a weekday and not a holiday) and the current time of day is within a predefined threshold from when school starts and/or ends, the vehicle controller 110 generates an alert to the driver 115 to watch out for children. Vehicle controller 110 may determine if it is a day when school is in session and the times when that specific school starts and/or ends based on information received from remote servers 226. By combining location data, date/time data, and information about that specific school, the alert to watch out for children is only provided to the driver on days/times when children are likely to be present. In other words, by combining location data, date/time data, and school-specific data, the alert to watch out for children is not presented to the driver on days/times when children are not likely to be present.

In some other embodiments, the vehicle controller 110 may determine that the vehicle 100 is parked in a parking lot or a parking garage structure. The vehicle controller 110 also determines that the parking lot/structure is located within a predefined distance from restaurants. Moreover, the vehicle controller 110 also determines that the current time is within predefined time periods when pedestrians are commonly going to or coming from those restaurants. For example, pedestrians are more likely to be going to or leaving the restaurants from 10:00 AM to 2:00 PM for lunch or 4:00 PM and 7:00 PM for dinner. In another example, the vehicle controller 110 may determine that pedestrians are more likely to be present near the vehicle 100 during hours that the restaurants are open. Vehicle controller 110, based on a determination that the vehicle 100 has been parked in a parking space near restaurants, that a driver, by entering vehicle 100, starting the vehicle, and placing the vehicle in drive/reverse is likely going to exit the parking space 100, and that the nearby restaurants are currently open (e.g., based on information from remote servers 226), may provide the driver with an alert, warning the driver that pedestrians are likely to be present. Although described with respect to restaurants, another example include providing an alert warning of possible pedestrians when vehicle 100 is beginning to leave a parking space near a store/mall/shopping center and the store/mall/shopping center is open (e.g., when pedestrians are more likely to be near the vehicle 100), but not providing that alert when the store/mall/shopping center is closed (e.g., when pedestrians are less likely to be near the vehicle 100).

In another example, the vehicle controller 110 determines, for example, based on data received from remote servers 226, that the current time is close to the time when the taverns are required to close in the state/city where the vehicle 100 is currently located. Furthermore, the vehicle controller 110 determines, based on GPS and/or map data received from remote servers 226, that there is at least one tavern located within a predefined distance of the current location. Based on this context information, the vehicle controller 110 then alerts the driver 115 to be alert for impaired drivers. Although it would not be impossible for an impaired driver to be driving away from a tavern earlier in the day, it is less likely. Therefore, providing this alert anytime vehicle 100 was near the tavern would likely be considered an annoyance. However, by only providing the alert at times when impaired drivers are more likely to be present, especially if the driver of vehicle 100 is not familiar with the area and does not know when taverns are required to close, provides the driver with useful, timely information.

In some of these embodiments, the vehicle controller 110 is in communication with a mapping program and receives context information from the mapping program. In these embodiments, the vehicle controller 110 may warn the driver 115 about unguarded railroad crossings, massive potholes, steel plates, and/or other road hazards. The vehicle controller 110 may retrieve the railroad schedule from the one or more remote servers 226 and warn the driver 115 that they may be approaching an active railroad crossing. In some of these embodiments, the mapping program and/or the remote servers 226 provide construction truck entrances, and then the vehicle controller 110 warns the driver 115 to watch for vehicles entering and/or leaving those entrances.

In still further embodiments, the vehicle controller 110 may receive information from remote servers 226 pertaining to concert venues and/or sports stadiums and generate alerts to the driver 115 when there may be a concert, event, and/or sporting event starting and/or letting out and causing traffic issues. Moreover, the vehicle controller 110 may receive information from remote servers 226 pertaining to a specific movie theater and movie start/end times. For example, the vehicle controller 110 may determine that the vehicle 100 has been parked near the movie theater and that the driver is beginning to leave the parking space. If the movie start/end times are within a threshold of the current time, the vehicle controller 110 may provide the driver with an alert, warning the driver that the number of pedestrians and/or amount of traffic might be higher since a movie has recently let out.

In some further embodiments, the processing is performed by a mobile device 125 connected to the vehicle controller 110. In other embodiments, the processing is performed by one or more remote servers 226, such as cloud servers, and then the messages and/or alert settings are transmitted to the vehicle controller 110.

Figure 3:
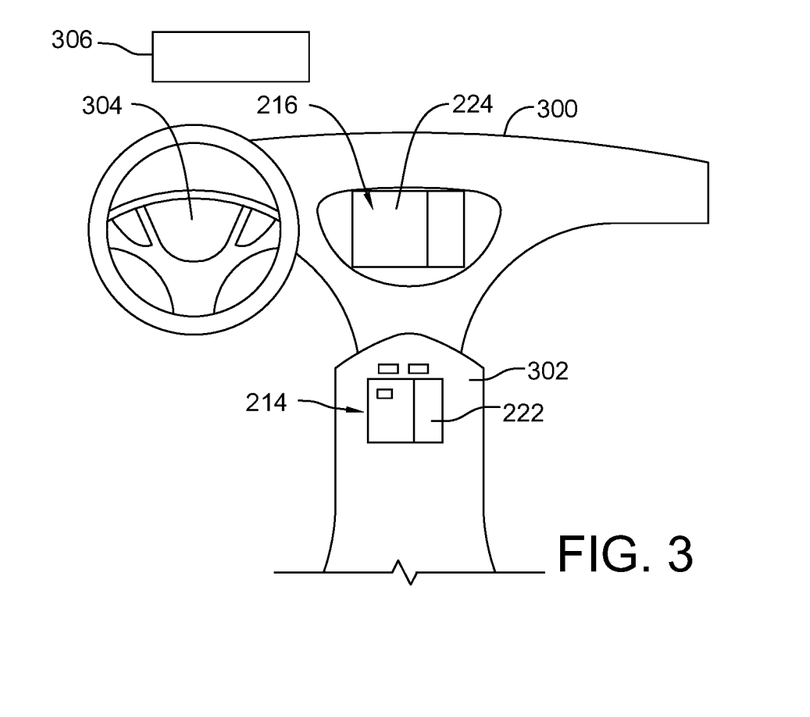
FIG. 3 is a partial schematic view of the vehicle shown in FIG. 1 including the vehicle control system, in accordance with one embodiment of the present disclosure.

FIG. 3 is a partial schematic view of the vehicle 100 (shown in FIG. 1) including the vehicle control system 200. The vehicle 100 includes a dashboard 300 and a center console 302. In an exemplary embodiment, the display device 216, including the display screen 224, is at a central portion of the dashboard 300 such that a user, or an operator/driver 115 (shown in FIG. 1), of the vehicle 100 may easily view the display screen 224 without being distracted from operating the vehicle 100. The display screen 224 may be located close to the user's eye level to enable the display screen 224 to be peripherally while the user is viewing the roadway ahead. In other embodiments, the display screen 224 may be at other locations within the vehicle 100. In another embodiment, the display screen 224 extends along the dashboard 300 from behind the steering wheel to the right edge of the center console 302. In some of these embodiments, there is a secondary display screen 304 embedded in the steering wheel. In some embodiments, the secondary display screen 304 is in communication with display device 216.

The touchpad 222 may be located next to the user of the vehicle 100. The touchpad 222 is positioned to be easily reachable by the user while operating the vehicle 100. In some embodiments, the touchpad 222 may be located in a center console area 302 next to the user. The touchpad 222 enables the user to select icons displayed on the display screen 224 and associated functions.

The control panel 214 may be communicatively coupled to the controller 218, which controls the display device 216, or may be communicatively coupled directly to the display device 216 for controlling the controller 218. Furthermore, the control panel 214 may be coupled to various sub-systems of the vehicle control system 200, such as the vehicle infotainment system 210, and the like. For example, the control panel 214, the display device 216 and the components of the sub-systems may be communicatively coupled to the processor 206 (shown in FIG. 1).

The display device 216 may have a home menu or main menu (not shown) having display icons corresponding to the various sub-systems, such as the vehicle infotainment system 210. The control panel 214 is used to maneuver through the main menu, such as to activate control of one of the sub-systems. For example, the user may touch the touchpad 222 and navigate to activate the various function modes or sources and/or to activate various function controls associated with the modes or sources. Such activation or execution may be performed by selecting a virtual button on the touchpad 222 associated with one of the display icons to activate control of the mode or source associated with such sub-system.

It should be understood that in other exemplary embodiments, the control panel 214 is combined with the display device 216, such that the user interacts with (e.g., touches) the display screen 224 directly to select or otherwise manipulate controls or other content displayed thereon, and that the embodiment of FIG. 3 is illustrative only.

In some embodiments, the vehicle 100 may also include a heads-up display 306. The heads-up display 306 may be in communication with the display device 216. In the exemplary embodiment, the heads-up display 306 projects information onto the windshield of the vehicle 100. This allows the driver 115 to view the information without looking away from the roadway.

Figure 4:
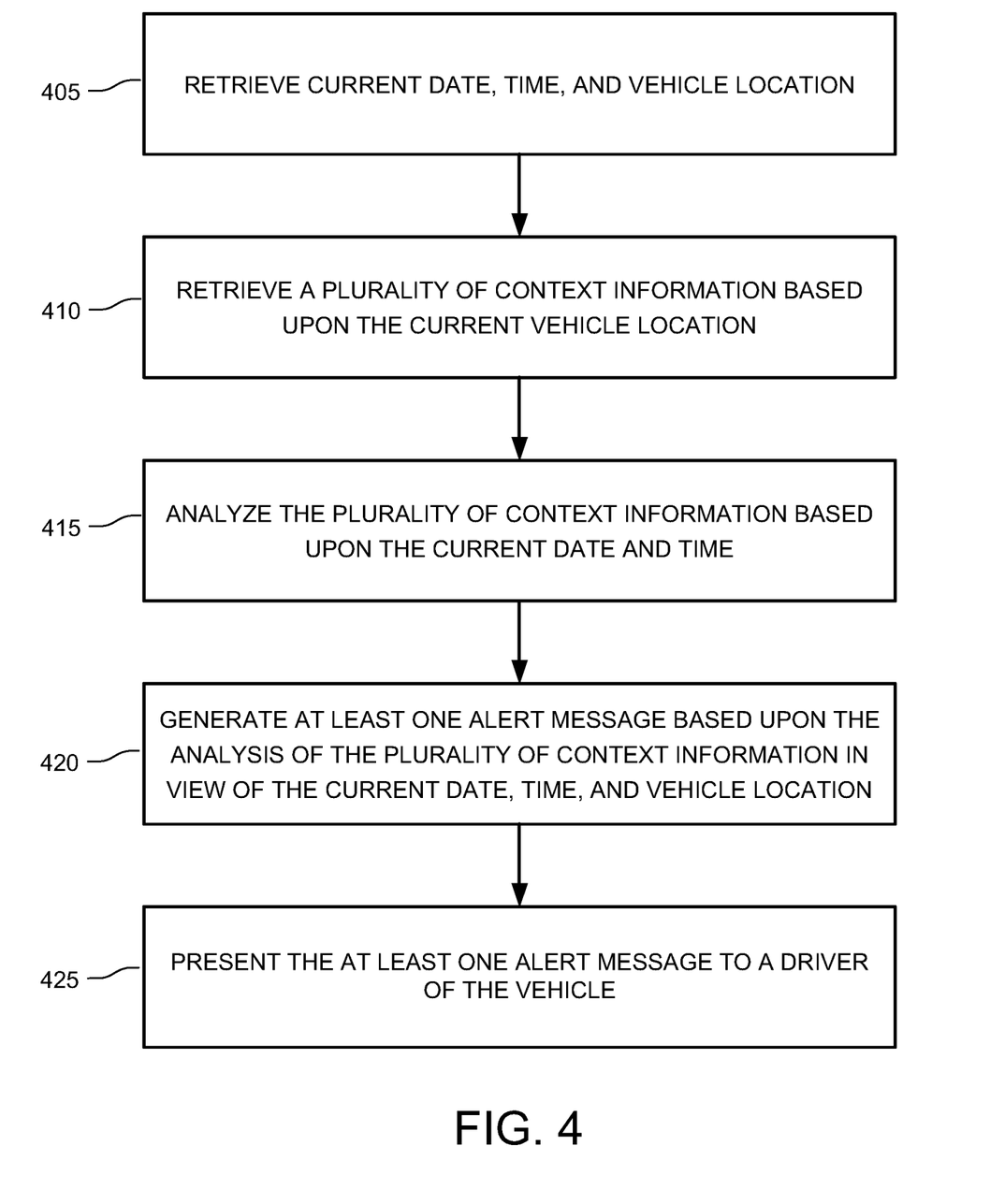
FIG. 4 illustrates a flowchart of a process for adjusting and determining vehicle alerts based upon real-time conditions of a vehicle using the system shown in FIG. 3, in accordance with at least one embodiment.

FIG. 4 illustrates a flowchart of a process 400 for adjusting and determining vehicle alerts based upon real-time conditions of a vehicle 100 (shown in FIG. 1) using the system 200 (shown in FIG. 2), in accordance with at least one embodiment. In the exemplary embodiment, the steps of process 400 are performed by the vehicle controller 110 (shown in FIG. 1) of the vehicle 100 (shown in FIG. 1). In other embodiments, the steps of process 400 are performed by one or more of mobile device 125 (shown in FIG. 1), controller 218, and portable device 220 (both shown in FIG. 2).

In the exemplary embodiment, the vehicle controller 110 retrieves 405 current date, time, and vehicle location. In some embodiments, the vehicle controller 110 is in communication with one or more sensors 105 (shown in FIG. 1) of the vehicle 100. In these embodiments, the vehicle controller 110 may retrieve 405 the current location from a GPS (global positioning system). In other embodiments, the vehicle controller 110 may determine the current location of the vehicle 100 based on cameras or other sensors 105.

The vehicle controller 110 may determine the current location of the vehicle 100 from GPS information, cameras, and/or wireless connections. For example, the vehicle 100 may be connected to a Wi-Fi network at the driver's home. The vehicle controller 110 can use that connection to determine the vehicle 100 is at the driver's home, even if the vehicle controller 110 is unable to determine current GPS coordinates for the vehicle 100. The vehicle controller 110 can also use the camera to determine that the vehicle 100 is in a parking lot, garage, parked on the side of the road, and/or in a parking garage, for example.

In the exemplary embodiment, the vehicle controller 110 retrieves 410 a plurality of context information based upon the current vehicle location. The plurality of context information may include traffic data, weather data, map data, and/or other information as described herein. In some embodiments, the vehicle controller 110 retrieves 410 the plurality of context information from one or more remote servers 226. In these embodiments, the vehicle controller 110 transmits a current vehicle location to the one or more remote servers 226. Then the vehicle controller 110 receives the plurality of context information associated with the current vehicle location. In some further embodiments, the vehicle controller 110 retrieves 410 at least a portion of the plurality of context information from one or more sensors 105 of a vehicle 100 associated with the vehicle controller 110.

In the exemplary embodiment, the vehicle controller 110 analyzes 415 the plurality of context information based upon the current date and time. For example, if the context information includes weather data, the vehicle controller 110 may determine the current weather conditions as well as future weather conditions. The alerts may be tailored to encourage safe travel during adverse weather conditions, such as, but not limited to, rain, snow, low visibility, and/or other conditions. The vehicle controller 110 may then determine that the temperature will reach over 100 degrees later in the day. When the vehicle controller 110 determines that the vehicle 100 is in a parking lot, the vehicle controller 110 may present a message to the driver 115 (shown in FIG. 1) to warn them to put up their sunshade or park in the shade to prevent the vehicle 100 from getting to hot.

In the exemplary embodiment, the vehicle controller 110 generates 420 at least one alert message based upon the analysis of the plurality of context information in view of the current date, time, and vehicle location.

In the exemplary embodiment, the vehicle controller 110 presents 425 the at least one alert message to a driver 115 of the vehicle 100. In the exemplary embodiment, the at least one alert message is presented 425 via one or more display devices 216 (shown in FIG. 2) of the vehicle 100. In some of these embodiments, the at least one alert message is presented 425 on one or more of an infotainment panel 130 (shown in FIG. 1), a display screen 224 (shown in FIG. 2), a secondary display screen 304, and/or a heads-up display 306 (both shown in FIG. 3). In other embodiments, the at least one message is presented 425 audibly, such as via one or more speakers of the vehicle 100.

In some embodiments, the vehicle controller 110 presents 425 the at least one alert message to the driver 115 by transmitting the at least one alert message to a display screen 224 to be displayed to the driver 115 on the display screen 224. In some additional embodiments, the vehicle controller 110 presents 425 the at least one alert message to the driver 115 by transmitting the at least one alert message to a speaker to be audibly presented to the driver via the speaker.

In some embodiments, the plurality of context information includes weather information, current traffic information, map data, and/or other information as described herein. In some of these embodiments, the at least one alert message is a warning about current driving conditions based on the weather information. In other embodiments, the at least one alert message is a warning about current driving conditions.

In some further embodiments, the at least one alert message is a warning that the vehicle is entering one of a school zone and a construction zone. The plurality of context information can include hours associated with the school zone. The vehicle controller 110 determines whether or not to present the at least one alert message based on the current time and the hours associated with the school zone. The vehicle controller 110 may also determine that the current date is a school holiday from the plurality of context information and prevent display of the at least one message associated with the school zone.

In additional embodiments, the plurality of context information includes dates and times associated with the construction zone. The vehicle controller 110 determines whether or not to present the at least one alert message based on the dates and times associated with the construction zone in view of the current date and time.

In some embodiments, the vehicle controller 110 prioritizes one or more messages based upon the analysis of the context information in view of the current date, time, and vehicle location.

In additional embodiments, the vehicle 100 includes a plurality of sensors 105. The vehicle controller 110 determines the current location of the vehicle 100 based upon the plurality of sensors 105.

In further embodiments, the vehicle controller 110 determines a current noise level and adjust a volume for presenting the at least one alert message based upon the current noise level. In some further embodiments, the vehicle controller adjusts the volume of the audible portion of the alerts. For example, when the vehicle is in the middle of a noisy city, the alerts may be louder. While the vehicle is travelling in a quiet night, the alerts may be presented a lower volume.

In some embodiments, the vehicle controller 110 retrieves the current speed of the vehicle 100. The vehicle controller 110 determines whether or not to present the at least one message based upon the current speed of the vehicle 100.

In some further embodiments, the processing is performed by a mobile device 125 connected to the vehicle controller 110. In other embodiments, the processing is performed by one or more remote servers 226, such as cloud servers, and then the messages and/or alert settings are transmitted to the vehicle controller 110.

Figure 5:
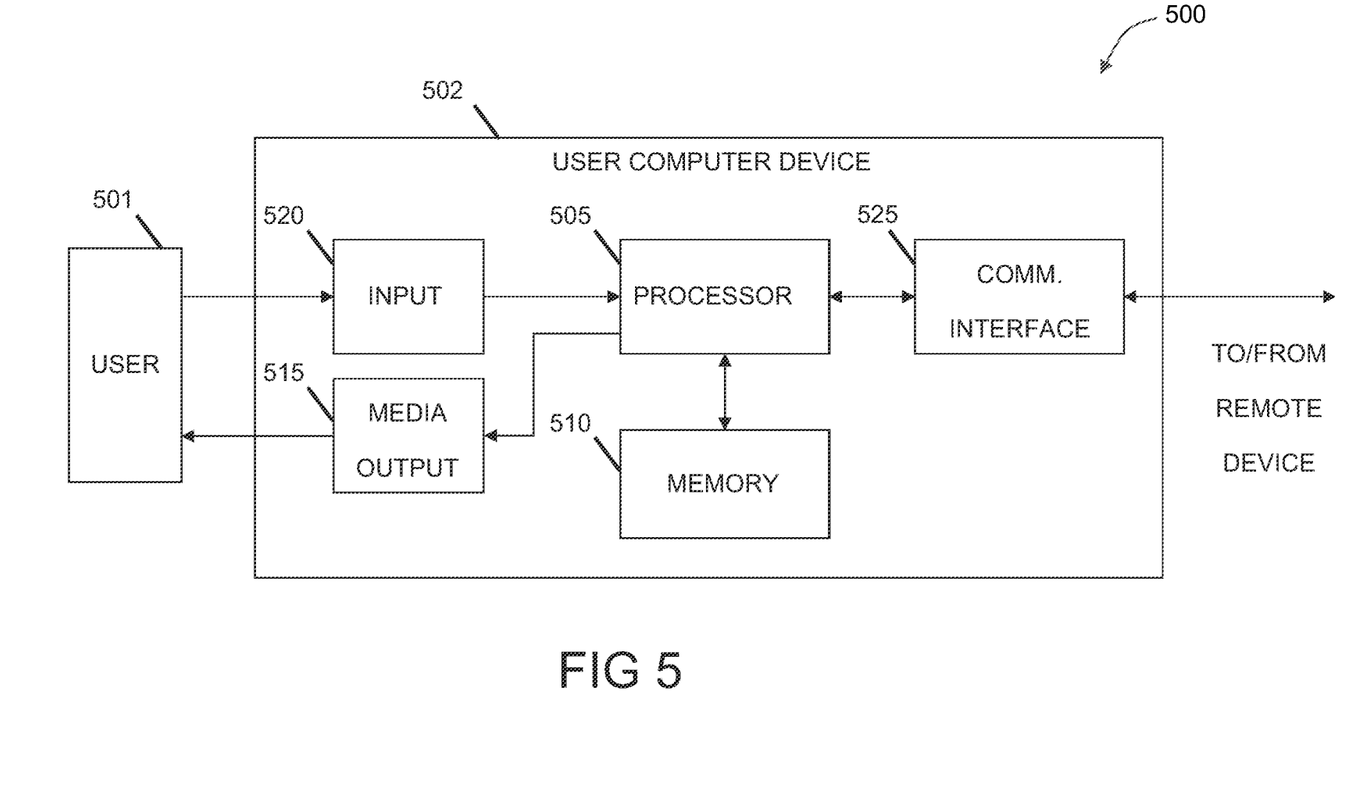
FIG. 5 illustrates an exemplary configuration of a user computer device, in accordance with one embodiment of the present disclosure.

FIG. 5 depicts an exemplary configuration of the computer devices shown in FIGS. 1 and 2, in accordance with one embodiment of the present disclosure. User computer device 502 may be operated by a user 501. In the exemplary embodiment, user 501 may be similar to driver 115 (shown in FIG. 1). User computer device 502 may include, but is not limited to, vehicle controller 110, mobile device 125 (both shown in FIG. 1), controller 218, and portable device 220 (both shown in FIG. 2). User computer device 502 may include a processor 505 for executing instructions. In some embodiments, executable instructions are stored in a memory area 510. Processor 505 may include one or more processing units (e.g., in a multi-core configuration).

Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501, such as through the infotainment panel 130 (shown in FIG. 1). A graphical user interface may include, for example, route information. In some embodiments, user computer device 502 may include an input device 520 for receiving input from user 501. User 501 may use input device 520 to, without limitation, entering or updating one or more user preferences.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as mobile device 125 or vehicle controller 110. Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from vehicle controller 110. A client application allows user 501 to interact with, for example, vehicle controller 110. For example, instructions may be stored by a cloud service, and the output of the execution of the instructions sent to the media output component 515.

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 may be programmed with the instructions such as illustrated in FIG. 4.

In some embodiments, user computer device 502 may include, or be in communication with, one or more sensors, such as sensor 105 (shown in FIG. 1) or camera 305 (shown in FIG. 3). User computer device 502 may be configured to receive data from the one or more sensors and store the received data in memory area 510. Furthermore, user computer device 502 may be configured to transmit the sensor data to a remote computer device, such as vehicle controller 110 or mobile device 125, through communication interface 525.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

Figure 6:
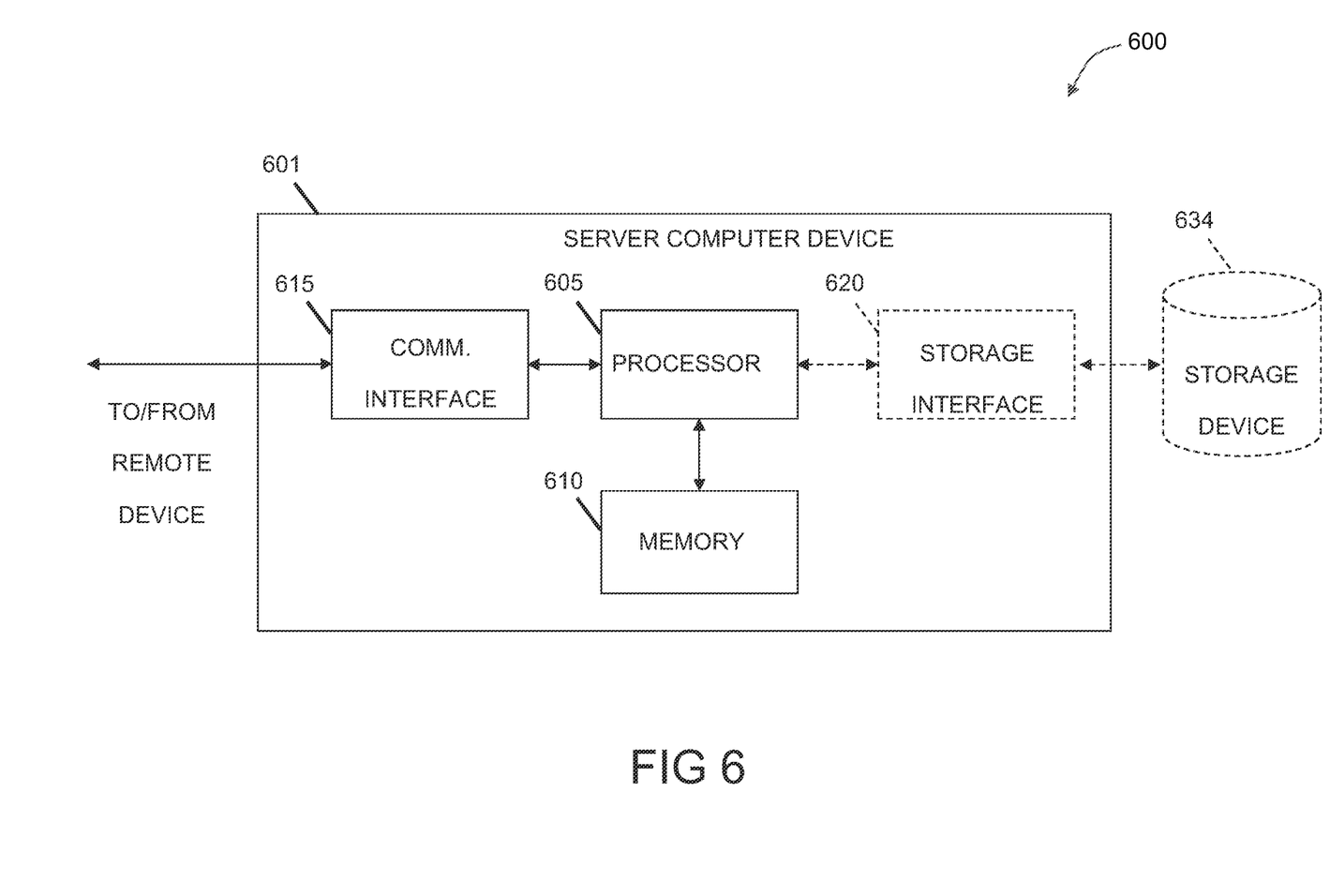
FIG. 6 illustrates an exemplary configuration of a server computer device, in accordance with one embodiment of the present disclosure.

FIG. 6 illustrates an example configuration of the server system shown in FIG. 3, in accordance with one embodiment of the present disclosure. Server computer device 601 may include, but is not limited to, vehicle controller 110 (shown in FIG. 1), controller 218, and remote servers 226 (shown in FIG. 2). Server computer device 601 also includes a processor 605 for executing instructions. Instructions may be stored in a memory area 610. Processor 605 may include one or more processing units (e.g., in a multi-core configuration).

Processor 605 is operatively coupled to a communication interface 615 such that server computer device 601 is capable of communicating with a remote device such as another server computer device 601, vehicle controller 110, controller 218, or remote servers 226. For example, communication interface 615 may receive requests from the vehicle controller 110 in the vehicle 100 (shown in FIG. 1) from via the Internet.

Processor 605 may also be operatively coupled to a storage device 634. Storage device 634 is any computer-operated hardware suitable for storing and/or retrieving data, such as, but not limited to, data associated with a database. In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 executes computer-executable instructions for implementing aspects of the disclosure. In some embodiments, the processor 605 is transformed into a special purpose microprocessor by executing computer-executable instructions or by otherwise being programmed. For example, the processor 605 is programmed with instructions such as illustrated in FIGS. 3 and 5.

For the methods discussed directly above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; hazard avoidance, navigation or GPS-related systems; security and/or anti-hacking measures; and/or theft prevention systems.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle outlines and information, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, traffic timing, previous trips, and/or actual timing. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to determine user preferences and recognize vehicle outlines.

Based upon these analyses, the processing element may learn how to identify characteristics and patterns that may then be applied to analyzing image data, model data, and/or other data. For example, the processing element may learn, to identify trends of traffic based on vehicle types and outlines. The processing element may also learn how to identify trends that may not be readily apparent based upon collected vehicle information.

The exemplary systems and methods described and illustrated herein therefore significantly increase the safety of operation of autonomous and semi-autonomous vehicles by reducing the potential for damage to the vehicles and the vehicle's surroundings.

The present systems and methods are further advantageous over conventional techniques the embodiments herein are not confined to a single type of vehicle and/or situation but may instead allow for versatile operation within multiple different types of vehicles, including ground craft, watercraft, aircraft, and spacecraft. Accordingly, these novel techniques are of particular value to vehicle manufacturers who desire to have these methods and systems available for the users of their vehicles.

Exemplary embodiments of systems and methods for securely navigating traffic lights are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A vehicle comprising:
a vehicle controller comprising at least one processor in communication with at least one memory device, wherein the vehicle controller is programmed to:
retrieve current date, time, and vehicle location;
retrieve a plurality of context information based upon the current vehicle location;
analyze the plurality of context information based upon the current date and time;
prioritize one or more messages based upon the analysis of the context information in view of the current date, time, and vehicle location;
generate at least one alert message based upon the analysis of the plurality of context information in view of the current date, time, and vehicle location; and
present the at least one alert message to a driver of the vehicle.

2. The vehicle of claim 1, wherein the plurality of context information includes weather information.

3. The vehicle of claim 2, wherein the at least one alert message is a warning about current driving conditions based on the weather information.

4. The vehicle of claim 1, wherein the context information includes current traffic information.

5. The vehicle of claim 4, wherein the at least one alert message is a warning about current driving conditions.

6. The vehicle of claim 1, wherein the at least one alert message is a warning that the vehicle is entering one of a school zone and a construction zone.

7. The vehicle of claim 6, wherein the plurality of context information includes hours associated with the school zone, and wherein the vehicle controller is further programmed to determine whether or not to present the at least one alert message based on the current time and the hours associated with the school zone.

8. The vehicle of claim 6, wherein the vehicle controller is further programmed to determine that the current date is a school holiday from the plurality of context information and prevent display of the at least one message associated with the school zone.

9. The vehicle of claim 6, wherein the plurality of context information includes dates and times associated with the construction zone, wherein the vehicle controller is further programmed to determine whether or not to present the at least one alert message based on the dates and times associated with the construction zone in view of the current date and time.

10. The vehicle of claim 1 further comprises a plurality of sensors, and wherein the vehicle controller is further programmed to determine the current location of the vehicle based upon the plurality of sensors.

11. The vehicle of claim 1, wherein the vehicle controller is further programmed to determine a current noise level and adjust a volume for presenting the at least one alert message based upon the current noise level.

12. The vehicle of claim 1, wherein the vehicle controller is further programmed to retrieve the current speed of the vehicle, and determine whether or not to present the at least one message based upon the current speed of the vehicle.

13. A computer device comprising:
at least one memory; and
at least one processor in communication with the at least one memory, the at least one processor programmed to:
retrieve current date, time, and vehicle location;
retrieve a plurality of context information based upon the current vehicle location;
analyze the plurality of context information based upon the current date and time;
prioritize one or more messages based upon the analysis of the context information in view of the current date, time, and vehicle location;
generate at least one alert message based upon the analysis of the plurality of context information in view of the current date, time, and vehicle location; and
present the at least one alert message to a driver.

14. The computer device of claim 13, wherein to retrieve a plurality of context information the at least one processor is further programmed to retrieve the plurality of context information from one or more remote servers.

15. The computer system of claim 14, wherein the at least one processor is further programmed to:
transmit a current vehicle location to the one or more remote servers; and
receive the plurality of context information associated with the current vehicle location.

16. The computer system of claim 13, wherein the at least one processor is further programmed to retrieve at least a portion of the plurality of context information from one or more sensors of a vehicle associated with the computer system.

17. The computer device of claim 13, wherein to present the at least one alert message to the driver the at least one processor is further program to transmit the at least one alert message to a display screen to be displayed to the driver on the display screen.

18. The computer device of claim 13, wherein to present the at least one alert message to the driver the at least one processor is further program to transmit the at least one alert message to a speaker to be audibly presented to the driver via the speaker.

19. The computer device of claim 13, wherein the plurality of context information includes weather information, and wherein the at least one alert message is a warning about current driving conditions based on the weather information.

20. The computer device of claim 13, wherein the at least one processor is further programmed to retrieve the current speed of the vehicle, and determine whether or not to present the at least one message based upon the current speed of the vehicle.

* * * * *